United States Patent Office 3,574,654
Patented Apr. 13, 1971

3,574,654
METHOD OF PRODUCING SPHEROIDAL AGGLOMERATES
Robert E. Cowan and E. Philip Ehart, Los Alamos, N. Mex., assignors to the United States of America as represented by the United States Atomic Energy Commission
No Drawing. Filed July 12, 1968, Ser. No. 744,319
Int. Cl. C09c 3/00
U.S. Cl. 106—309         5 Claims

ABSTRACT OF THE DISCLOSURE

A method of forming spheroidal agglomerates of particles in which oleic acid is mixed with a powdered ceramic material, adding to this mixture ammonium hydroxide, and subsequently agitating.

This invention described herein was made in the course of, or under, a contract with the U.S. Atomic Energy Commission.

Free-flowing powders are very advantageous when used in dry pressing since they flow so easily. The process described herein has been useful for preparing a wide variety of materials such as setting sand for firing ceramics and the dispersed second phase of an oxide in metal matrices. In the first case, the spheroids are placed beneath a ceramic object which is being fired. As shrinkage occurs, the spherical grains allow the object to shrink uniformly.

In the second application, the fired spheroids are a dispersed second phase of an oxide or carbide in a metal matrix. Such mixtures are frequently used as fuel elements or control rods in nuclear reactors. A specific application is the preparation of boron carbide spheres by this method. These spheres will then be fired and incorporated into a copper matrix for use as control rods in a nuclear propelled rocket. Free-flowing powders may be made by other methods such as spray drying, but these are more expensive and time consuming than the present method.

In the present invention, a saponification reaction is utilized in order to form spheroidal agglomerates of inorganic particles. More particularly, a small amount of fatty acid is thorughly mixed with a powdered, water-insoluble inorganic material. A strong inorganic base in an amount sufficient to neutralize the acid is then added to the fatty acid and powdered material and then thoroughly mixed, tumbled, or agitated. The mechanical motion and reaction causes spheroidal agglomerates of small particles to form. The resulting particles (which are really not particles, but rather loose agglomerates) are very free flowing and spheroidal in shape.

It is therefore an object of this invention to provide a method for producing spheroidal agglomerates of water-insoluble inorganic material, and more specifically, an agglomerating process for ceramic-type material.

Other objects of this invention will be apparent from the following description in which alumina, magnesia, and boron carbide materials are formed into spheroidal agglomerates using the method of this invention.

A specific procedure utilized in practicing this invention is as follows:

Fused $Al_2O_3$ powder is added to oleic acid in the amount of 2 ml. of oleic acid per 100 grams of $Al_2O_3$. The $Al_2O_3$ weighing 1500 grams is mixed with the oleic acid in a twin shell blender. After thoroughly mixing the oleic acid in the $Al_2O_3$, 150 ml. of water is added, 50 ml. at a time, while the powder is being mixed. To this mixture 25 ml. of a 15 N $NH_4OH$ solution is added and mixing is continued for 5 minutes. At this point, the powder is observed to have agglomerated into spheroidal shaped particles. The powder is then allowed to dry in air for 15 hours.

A second specific procedure utilizing the method of this invention and particularly setting forth the parameters for the formation of spheroidal agglomerates of magnesia is as follows:

Magnesia powder weighting 1500 grams is added to oleic acid in the amount of 1 ml. of oleic acid per 100 grams of magnesia. The powdered magnesia is placed in a twin shell blender to which appproximately 150 ml. of water is added, 50 ml. at a time, while the powder is being mixed. To this mixture, 25 ml. of 15 N $NH_4OH$ is added, and the mixing is continued for about 15 minutes. The resulting powder is observed to have agglomerated into spheroidal shaped particles. At this point, the agglomerated powder is partially dried by an air blower for a period of about 6 hours.

A third specific procedure using the method of this invention is as follows:

Boron carbide powder is added to oleic acid in the amount of 1 ml. of oleic acid per 100 grams of boron carbide. Boron carbide powder weighing 1500 grams and coated with the oleic acid is placed in a blender for a period of about 30 minutes. To this mixture is added 25 ml. of 15 N $NH_4OH$ and 150 ml. of water. This resulting boron carbide powder is observed to have agglomerated into spheroidal shaped particles which are then air dried.

Although the invention has been described in particular as to alumina, magnesia, and boron carbide, it is within the scope of this invention to apply this process to any inorganic water-insoluble material. Further, although oleic acid and $NH_4OH$ are the particular acid and base stated in the three embodiments of this invention, it is to be understood that any monobasic organic acid can be used and any strong inorganic base. The amount of oleic acid needed is a function of the particle size of the starting material; however, the inventors have found that less than ½ percent by weight of the acid makes the process inoperative. Normally, 1–3 percent by weight acid addition is sufficient, no surplus over this amount being necessary, the larger amount being required for fine particles (larger reacting area), less for coarse particles. Likewise, the tumbling or mixing time after the base has been added to the acid-coated ceramic is a function of the desired particle size, i.e., the longer the mixing time, the larger the particle. The amount of water necessary is about 10 percent by weight with more than 15 percent being excessive. A paste is formed when excessive water additions are used rather than the spheroidal agglomerate. The drying times, as stated in the various embodiments, are not critical and variations of same is a function of the particle size, and furthermore, the invention is to be limited solely by the appended claims.

What we claim is:

1. A method of forming spheroidal agglomerates of inorganic water-insoluble particles comprising mixing about 1 percent by weight of oleic acid with a powdered inorganic water insoluble material selected from the class consisting of alumina, magnesia, and boron carbide, adding 10-15 percent by weight water and a sufficient amount of NH₄OH to react with the acid present, and subsequently agitating and drying the formed particles.

2. The method of claim 1 wherein the said water-insoluble material is alumina.

3. The method of claim 1 wherein the said water-insoluble material is magnesia.

4. The method of claim 1 wherein the said water-insoluble material is boron carbide.

5. The method of claim 1 wherein the amount of water added is 10 percent by weight of the said material and the drying time is about 15 hours.

References Cited

UNITED STATES PATENTS

| | | | |
|---|---|---|---|
| 2,987,412 | 6/1961 | Csonka et al. | 106—309X |
| 3,223,482 | 12/1965 | Puddington et al. | 106—309X |
| 3,333,980 | 8/1967 | McCord | 306—309X |

JAMES E. POER, Primary Examiner

H. M. S. SNEED, Assisstant Examiner

U.S. Cl. X.R.

106—288B, 306